(12) United States Patent
Gessner et al.

(10) Patent No.: US 8,837,740 B2
(45) Date of Patent: Sep. 16, 2014

(54) DEVICE AND METHOD FOR SECURING A NEGOTIATION OF AT LEAST ONE CRYPTOGRAPHIC KEY BETWEEN UNITS

(75) Inventors: Jürgen Gessner, Forstinning (DE); Bernhard Isler, Wilen b. Wollerau (CH); Frank Liese, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/518,332

(22) PCT Filed: Nov. 17, 2010

(86) PCT No.: PCT/EP2010/067648
§ 371 (c)(1),
(2), (4) Date: Jun. 21, 2012

(87) PCT Pub. No.: WO2011/076491
PCT Pub. Date: Jun. 30, 2011

(65) Prior Publication Data
US 2012/0257757 A1    Oct. 11, 2012

(30) Foreign Application Priority Data

Dec. 21, 2009  (DE) .......................... 10 2009 059 893

(51) Int. Cl.
*H04L 9/08* (2006.01)
*H04L 29/06* (2006.01)
*H04L 9/30* (2006.01)

(52) U.S. Cl.
CPC .............. *H04L 9/083* (2013.01); *H04L 63/061* (2013.01); *H04L 9/30* (2013.01); *H04L 63/0442* (2013.01)

USPC ........................................................ 380/282

(58) Field of Classification Search
USPC ................................................. 713/277–285
See application file for complete search history.

(56) References Cited

U.S. PATENT DOCUMENTS

| 6,694,025 | B1 * | 2/2004 | Epstein et al. ................. 380/279 |
| 7,146,009 | B2 * | 12/2006 | Andivahis et al. ............ 380/277 |
| 2005/0135271 | A1 | 6/2005 | Inoue et al. |
| 2006/0093150 | A1 * | 5/2006 | Reddy et al. .................. 380/282 |

(Continued)

FOREIGN PATENT DOCUMENTS

| DE | 10 2004 052 194 A1 | 6/2005 |
| DE | 102009059893.6 | 12/2009 |

(Continued)

OTHER PUBLICATIONS

Schwaiger, Christian, and Albert Treytl. "Smart card based security for fieldbus systems." Emerging Technologies and Factory Automation, 2003. Proceedings. ETFA'03. IEEE Conference. vol. 1. IEEE, 2003. pp. 398-406.*

(Continued)

*Primary Examiner* — Jeffrey Pwu
*Assistant Examiner* — Carlos Amorin
(74) *Attorney, Agent, or Firm* — Staas & Halsey LLP

(57) ABSTRACT

A private key and a public key are provided during manufacture of a device and are stored in the device. At least one cryptographic key is subsequently negotiated, the negotiation being security-protected as a function of the generated private key and/or the public key. This method can find application in building automation.

14 Claims, 3 Drawing Sheets

(56) References Cited

U.S. PATENT DOCUMENTS

| | | | |
|---|---|---|---|
| 2007/0038853 A1* | 2/2007 | Day et al. | 713/153 |
| 2008/0049942 A1 | 2/2008 | Sprunk et al. | |
| 2009/0060188 A1 | 3/2009 | McGrew et al. | |
| 2009/0198997 A1* | 8/2009 | Yeap et al. | 713/155 |
| 2010/0284402 A1* | 11/2010 | Narayanan | 370/390 |
| 2010/0306530 A1* | 12/2010 | Johnson et al. | 713/155 |
| 2011/0083197 A1* | 4/2011 | Claudatos et al. | 726/28 |
| 2011/0307692 A1* | 12/2011 | Fritzges et al. | 713/151 |

FOREIGN PATENT DOCUMENTS

| | | | | |
|---|---|---|---|---|
| EP | 1 901 145 A2 | 3/2008 | | |
| EP | 1901145 A2 * | 3/2008 | | G05B 19/042 |
| WO | 2005/010214 A2 | 2/2005 | | |
| WO | WO 2005010214 A2 * | 2/2005 | | C12Q 1/68 |

OTHER PUBLICATIONS

Popescu, Bogdan C., Bruno Crispo, Andrew S. Tanenbaum, and Frank LAJ Kamperman. "A DRM security architecture for home networks." In Proceedings of the 4th ACM workshop on Digital rights management, pp. 1-10. ACM, 2004.*

International Search Report for PCT/EP2010/067648; mailed Feb. 23, 2011.

"Proposed Addendum g to Standard 135-2004, BACnet®—A Data Communication Protocol for Building Automation and Control Networks"; American Society of Heating Refrigerating and Air-Conditioning Engineers, Inc.; Sep. 2008; pp. 1-115.

R. Dutta et al.; "Overwiew of Key Agreement Protocols"; Cryptology ePrint Archive: Report 2005/289; printed from eprint.iacr.org/2005/289.pdf; pp. 1-46.

"Trusted Platform Modules Strengthen User and Platform Authenicity"; Trusted Computing Group; Jan. 2005; pp. 1-8; printed from www.trustedcomputinggroup.org/files/resource_files/8D46621F-1D09-3519-ADB205692DBBE135/Whitepaper.pdf.

W. Granzer et al.; "Securing IP Backbones in Building Automation Networks"; 7th IEEE International Conference on Industrial Informatics; Jun. 2009; pp. 410-415.

A. Menezes et al.; Chapter 12: Key Establishment Protocols; Handbook of Applied Cryptography; CRC Press; 1997; pp. 489-541; printed from www.cacr.math.uwaterloo.ca/hac/ORD.

* cited by examiner

DEVICE AND METHOD FOR SECURING A NEGOTIATION OF AT LEAST ONE CRYPTOGRAPHIC KEY BETWEEN UNITS

CROSS REFERENCE TO RELATED APPLICATIONS

This application is the U.S. national stage of International Application No. PCT/EP2010/067648, filed Nov. 17, 2010 and claims the benefit thereof. The International Application claims the benefits of German Application No. 102009059893.6 filed on Dec. 21, 2009, both applications are incorporated by reference herein in their entirety.

BACKGROUND

Described below is a method and an apparatus for ensuring an interception- and counterfeit-proof communication between devices, and more particularly to a method and an apparatus for protecting a negotiation of at least one cryptographic key. Also described below is a computer program product which initiates the execution of a method for protecting a negotiation of at least one cryptographic key, as well as to a data storage facility on which the computer program product is stored.

In modern-day building technology applications, a plurality of devices and components are installed not only in factory buildings, but also in business and private premises. It is possible in such cases that at least a selection of the installed devices will communicate with one another and in the process exchange data. A possible application scenario involving intercommunicating devices is building automation. In such applications a central control unit is typically provided which addresses a plurality of devices by control commands and thereby regulates for example the air conditioning for the entire building. Given a suitable infrastructure, the devices installed in a building can be configured in a peer-to-peer or client-server network.

Furthermore, vehicles are known which are provided with control units that communicate with appliances installed in a household by a wireless interface. Thus, it is known that a car driver can control the amount of heat generated by a heating appliance or the closing or opening of shutters by his/her in-car display via a mobile radio interface. In the application scenarios described, the plurality of devices communicating with one another are in some cases sourced from different manufacturers, for which reason the communication networks are characterized by a high degree of heterogeneity in terms of the manufacturers of network components and the use of network protocols. What is crucial in the application scenario is that the communication between the individual devices can take place in an interception- and counterfeit-proof manner. Various network technologies and encryption protocols are known for this purpose.

A well-known protocol, in particular in the building automation field, i.e. in an automated system for controlling devices installed in buildings, is the BACnet protocol, where BACnet stands for "Building Automation and Control Network". This is a network protocol which supports communication between devices in building automation technology and a corresponding risk management system. BACnet Security is based on symmetric cryptography, i.e. the communicating devices must have in common a secret, also referred to as a key, which they share. A key server is provided for distributing keys; using a "basic key" as a basis, the key server distributes further keys securely to the communicating devices. The "basic key", referred to in the BACnet standard as a "device master key", is individual and unique, i.e. different for each device. It must be imported into the key server or into the communicating device in a suitable, secure manner and with an absolute minimum of configuration effort in order to enable the secure distribution of further keys between key server and device.

The BACnet specification describes a shipping of the devices with a device master key which is printed on a tear-off label. The label is removed and the device master key is entered manually into the key server. BACnet also supports commands for transporting a device master key from the key server over the device network. However, these possibilities have the disadvantage that they are time-consuming and labor-intensive as well as prone to error, since they are based on manual input or are insecure because a distribution of keys is performed over the insecure network.

Cryptographic methods are employed inter alia for encrypting messages, signing documents and authenticating persons or objects. Techniques referred to as asymmetric encryption methods in particular are suitable for this, since they provide a subscriber both with a private key, which is kept secret, and a public key.

When encrypting a message, the sender obtains the public key of the desired addressee and uses it to encrypt the message. Only the addressee is thereafter able to decrypt the message again using the private key known only to him/her.

When signing a document, a signatory uses his/her private key to compute an electronic signature from a document. Other persons can verify the signature without difficulty with the aid of the signatory's public key. However, only signatures signed with the associated private key can be verified by the public key. By this unique assignment, and based on the assumption that the private key is kept secret by the signatory, a unique assignment of the signature to the signatory and the document is produced.

The asymmetric cryptography methods are based, as explained above, on a private and a public key. In this scheme the public key is generated from the private key by a predetermined algorithm. What is crucial for the cryptographic methods is that it will not be possible using the available computing capacities to effect a reversal, i.e. to determine the private key from the public key, within a reasonable time. The latter is assured provided the key length of the private key attains a minimum length. The minimum length of the key is dependent on the algorithms used for the encryption and on the definition of the public key.

The operations using the public or private keys require a deployment of computing resources. This requirement is dependent on the algorithms used and also on the length of the keys used. It proves advantageous in this case to apply cryptographic methods based on elliptic curves, since these afford a high level of security with short key lengths. In contrast to other methods, no way of determining the private key from the public key is known in the related art for cryptography methods based on elliptic curves, the computing resources required therefor increasing more slowly than with an exponential increase with increasing key length.

Typically, known methods for protecting a key negotiation are complicated and time-consuming, prone to error and insecure. In particular in building technology or building automation, no methods are known which allow cryptographic keys used for encrypting a communication to be negotiated in a secure manner in an insecure network.

The publication WO 2005/010214 A2 discloses a method for negotiating a symmetric key for communication between wireless sensor nodes of a network, wherein the negotiation of the symmetric key between a sensor node and a key center is protected with the aid of asymmetric keys stored in the sensor nodes.

SUMMARY

Described below are a method and an apparatus for ensuring network security, and more particularly for protecting a negotiation of at least one cryptographic key between devices.

A method for protecting a negotiation of at least one cryptographic key between devices is accordingly provided. The method for protecting a negotiation includes: storing a private key and a public key on each individual device, the private key and the public key being provided for the respective device; storing each of the key pairs, including a private key and a public key for each individual one of the devices, on a device management station; and negotiating the at least one cryptographic key between the devices as a function of the stored private key and the stored public key by the device management station.

The devices can be components, machines, heating elements and/or production plants. The method may be deployed in an application scenario in the building automation field. In this connection the person of ordinary skill in the art will have knowledge of further devices which communicate with one another and in so doing negotiate a cryptographic key. It is possible for one of the devices to provide a central control function. For example, one of the devices can be present as a central management station or device management station. It is accordingly possible to install different devices in a building which communicate with one another through a designated central device as intermediary, for example a key server, in which case it may be necessary for the communication to be security-protected.

The devices installed in the building can be security-critical devices, for example. Thus, it is possible for the devices to represent and/or control a door closing system. Making access-controlled areas within the building accessible to authorized personnel only requires security protection techniques which enable a communication between the devices and in particular a negotiation of at least one cryptographic key between the devices to be security-protected. Protection in this context refers to preventing interception of messages exchanged between the devices as well as to guaranteeing integrity, i.e. authenticity of the exchanged messages, between the devices.

A communication can be encrypted by a cryptographic key. Typically it is necessary in this case for at least one key to be distributed to devices communicating with one another. The key, which it is necessary to distribute to the respective devices, can be a master key for example. In order to enable encrypted communication between devices it is typically necessary to have both a master key and a slave key available for encrypting and decrypting the message.

Consequently, at least one of the cryptographic keys must be negotiated between the devices. For this purpose it may be necessary to transmit at least the master key, also called the passkey, to all the communication partners, which is to say all the communicating devices. However, when the master key is transmitted to the devices, it may happen that the master key is intercepted. In one embodiment of the method for protecting a negotiation of at least one cryptographic key, a private key and a public key are provided for each individual one of the devices in order to prevent the key from being intercepted.

Using the private and public keys, it is henceforth possible to protect a negotiation of at least one cryptographic key, for example the master key.

The private key and the public key can be provided by known methods for example. Different approaches to this in the technical field of cryptography are known to the person skilled in the art. According to one embodiment of the method for protecting a negotiation of at least one cryptographic key, the private key and the public key can be generated for each device individually. In other words, each of the devices installed in the building is assigned precisely one private key and precisely one public key. It can be advantageous in this case if all the key pairs are known to a central control device within the building, for example the device management station. It may also be necessary for a device's own private key as well as its own public key to be known to all devices. If a negotiation of at least one cryptographic key is to take place in a client-server scenario, each of the key pairs, including a private key and a public key, for each of the devices may be known to the device management station. It is accordingly possible that the devices will not communicate directly with one another, that is to say will not conduct a negotiation of at least one cryptographic key with one another directly, but that they will communicate through the medium of a central authority, namely the device management station.

If a private key and a public key have been generated for each of the devices, this key pair can be communicated to the respective device. For this purpose provision can be made for storing the private key and the public key in each individual device. Toward that end it is possible for each device to have a data storage facility for storing the private and the public key.

Since a private key and a public key have now been generated and stored for each individual one of the devices, a negotiation of the at least one cryptographic key can be conducted between the devices as a function of the stored private key and the stored public key. This can be accomplished for example by the BACnet network protocol, the stored private key and the stored public key being used for encrypting the communication. If the negotiation of at least one cryptographic key is conducted in accordance with the BACnet network protocol, a message exchange in accordance with the BACnet network protocol is rendered secure by the private key and the public key.

The negotiation of the at least one cryptographic key can include for example a generation of a master key for each of the devices. In this case the master key may be known to every device, i.e. the device knows not only its own master key but also the master key of each of the other devices. Furthermore, a slave key can be generated for each of the devices, the generated slave key being known in each case only to each device itself. Moreover, the respective slave key can be encrypted by each individual device as a function of the master key. The thus encrypted slave keys can now be distributed to each of the devices.

If a negotiation of the at least one cryptographic key is to be conducted by a central control device, for example the device management station, it is advantageous if master keys are now available in pairs to the device management station, i.e. one master key for precisely one device and one master key for the device management station. In a further master key pair, a master key for a next device is available to the device management station together with a next master key for the device management station. It is also possible in this case for the device management station to have precisely one master key. In order to illustrate the pairwise master keys, reference is made to the following table:

| Device management station | Device | Key value |
|---|---|---|
| GVS-ID1 | G1-ID1 | Key value 1 |
| GVS-ID2 | G2-ID2 | Key value 2 |
| GVS-ID3 | G3-ID3 | Key value 3 |
| ... | ... | ... |
| GVS-IDn | Gn-IDn | Key value n |

In the above table, key pairs together with their value are entered for typically one device management station GVS. The parameter n in this case refers to the number of devices. It is possible that the single device management station will communicate with the terminal devices using different master keys GVS-ID1, GVS-ID2, GVS-ID3, ..., GVS-IDn or that the device management station will communicate with the devices using identical key values, in other words that GVS-ID1, GVS-ID2, GVS-ID3, ..., GVS-IDn have the same identification value.

According to one embodiment, a particularly advantageous aspect of the described method for protecting a negotiation of at least one cryptographic key is that both the public key and the private key can already be generated and stored in the respective device before the devices are put into operation. This is advantageous in particular because negotiating and importing a private key and a public key into a device at runtime can be dispensed with. Consequently, it is possible according to one embodiment to store the private key and the public key on the respective devices in a secure environment already at the time of manufacture of the devices, i.e. offline. The particularly error-prone and insecure negotiation of the private key and the public key at runtime is therefore avoided.

Any further communication between the devices can now be protected by the stored private key and the stored public key. Toward that end the messages serving for the negotiation of at least one cryptographic key can be encrypted.

In one embodiment of the method, a communication between the devices is encrypted by the negotiated cryptographic key.

This has the advantage that a communication between the devices can be protected by a cryptographic key that has been generated in a secure manner.

In a further embodiment of the method, the private key and the public key are stored during the manufacture of the respective device and/or prior to its being put into operation.

This has the advantage that the storing of the private key and the public key is carried out by a device manufacturer in a secure environment, i.e. without the private key and the public key needing to be negotiated at the runtime of the devices.

In a further embodiment of the method, the negotiation of the cryptographic key is conducted after the devices have been put into operation.

This has the advantage that the negotiation of the cryptographic key can be conducted dynamically at the runtime of the devices, though after the private key and the public key have already been stored in the device.

In another embodiment of the method, the negotiation of the cryptographic key is conducted in accordance with a network protocol.

This has the advantage that network infrastructures already existing at the time of the negotiation of the cryptographic key can be operated by already existing network protocols.

In a further embodiment of the method, the network protocol implements at least one cryptographic method.

This has the advantage that the network protocol provides additional security protection measures.

In another embodiment of the method, the negotiation is conducted at least partly by a BACnet (Building Automation and Control Network) network protocol.

This has the advantage that the described method for protecting a negotiation of at least one cryptographic key can be deployed in particular in application scenarios in the building automation field.

In a further embodiment of the method, the negotiation includes at least one direct or indirect message exchange between the devices.

This has the advantage that for example in a negotiation of at least one cryptographic key the devices can communicate directly with one another, for example in a peer-to-peer network, or indirectly, for example in a client-server network.

In another embodiment of the method, the message exchange is realized by at least one wireless or wired network.

This has the advantage that the message exchange within a building can be realized wirelessly, for example through the walls of the building, or in a wired manner, for example by broadband cable-based data links.

In a further embodiment of the method, at least one security certificate is created to allow an authentication check for at least one of the devices.

This has the advantage that an additional security mechanism is provided by which each individual device can be authenticated.

In another embodiment of the method, the security certificate is created as a function of at least one of the public keys.

This has the advantage that the security certificate is created as a function of a public key that has been generated in a secure manner.

In a further embodiment of the method, at least one of the public keys, private keys and/or cryptographic keys has a timestamp, an access authorization indicator, an alphanumeric character string, a numeric value and/or key data.

This has the advantage that at least one of the keys can be provided with a period of validity in respect of a specific device identity and rights specification.

In another embodiment of the method, the private key and the public key are provided by a key server.

This has the advantage that already existing infrastructures and key issuing agencies can be used in the present method.

Also described below is an apparatus for protecting a negotiation of at least one cryptographic key between devices. The apparatus for protecting a negotiation includes the following entities: a first computing entity for storing a private key and a public key in one data storage facility in each case in each individual device, the private key and the public key being provided for the respective device; and a second computing entity for negotiating the at least one cryptographic key between the devices as a function of the stored private key and the stored public key.

A computer program product may initiate execution of the described methods, and a data storage facility may store the computer program product.

A method and an apparatus for protecting a negotiation of at least one cryptographic key between devices are accordingly provided which permit a negotiation of at least one cryptographic key to be protected with little computational overhead and without the necessity of a message exchange for negotiating the private key and the public key.

In one embodiment of the method, a private key and a public key are provided separately from a negotiation of the at least one cryptographic key, thereby enabling the private key and the public key to be provided at the time of manufacture of the devices and the negotiation of the at least one cryptographic key to be conducted at the runtime of the devices.

Since the private key and the public key can be provided at the time of manufacture of the devices, the two keys, namely the private key and the public key, can be generated in a secure environment, such as a device production plant for example, and stored in a secure manner directly in the respective device.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
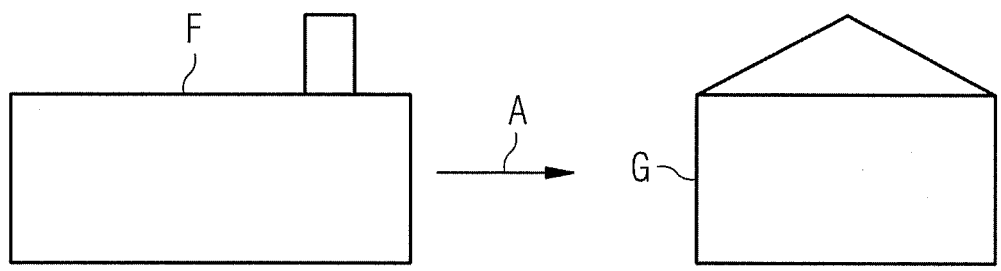
FIG. 1 is a block diagram of an exemplary application of a method for protecting a negotiation of at least one cryptographic key between devices according to an embodiment.

Reference will now be made in detail to the preferred embodiments, examples of which are illustrated in the accompanying drawings, wherein like reference numerals refer to like elements throughout.

Unless explicitly stated to the contrary, identical or functionally identical elements have been labeled with the same reference signs throughout the figures.

FIG. 1 shows an illustration of a method for protecting a negotiation of at least one cryptographic key according to an embodiment.

In this scenario a device is manufactured in a production plant F. In the present exemplary embodiment the device is a household appliance and after shipment A is to be installed in a building G. The device is for example a heating appliance which is controlled in terms of its heat output by a building automation system, i.e. an independent way of controlling devices within a building. Since not just one individual heating appliance is installed in the building G, but rather a plurality of heating appliances, it is necessary in order to regulate the temperature in the building G that the individual heating appliances communicate with one another and in so doing exchange for example measurement data relating to a heat generation profile.

The communication between the devices is to be protected in the present exemplary embodiment by a cryptographic key which the devices negotiate at runtime. For this purpose it is necessary that the negotiation of the at least one cryptographic key in itself is protected. If the negotiation of the at least one cryptographic key were not to be protected, there is the risk that unauthorized third parties may intercept the cryptographic key by monitoring the message exchange between the devices.

In the present embodiment of the method for protecting a negotiation of at least one cryptographic key, in order to protect the negotiation of the at least one cryptographic key the method employs a private key and a public key for each individual device. That is to say that a private key and a public key are provided for each individual device. Thus, if there are n devices present, it is possible in one embodiment that n private keys and n public keys are provided. Consequently, each individual device is assigned precisely one specific provided private key and public key. Precisely the private key and precisely the public key are stored on each individual device.

Providing the private key and the public key is particularly security-critical because the negotiation of the at least one cryptographic key is security-protected by the private key and the public key. In the present embodiment of the method for protecting the negotiation, the private key and the public key are provided and/or stored in the production plant F. The production plant F represents a trusted authority with regard to providing and storing the private and the public key. It is therefore possible to provide and store these very keys under particularly secure conditions within the production plant F. Accordingly it is possible to provide the private key and the public key in any arbitrary manufacturing step of the devices which are intended for installation in the building G. It is particularly advantageous in this case that the private and the public key do not have to be negotiated at a runtime of the devices, i.e. while the devices are in operation. Consequently, the private and the public key are already stored in each individual device prior to shipment A in the building G.

Thus, after the shipment A of the devices a negotiation of the at least one cryptographic key between the shipped devices can be protected by the private keys and public keys provided under secure conditions.

Figure 2:
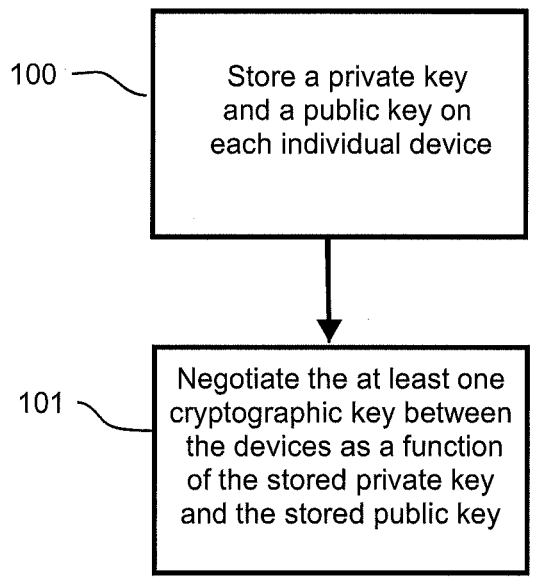
FIG. 2 is a flowchart of a method for protecting a negotiation of at least one cryptographic key between devices according to an embodiment.

FIG. 2 shows a method for protecting the negotiation of at least one cryptographic key between devices. The method includes the following: Storing 100 a private key and a public key on each individual device, the private key and the public key being provided for the respective device and negotiating 101 the at least one cryptographic key between the devices as a function of the stored private key and the stored public key. The described method can include further sub-steps and also be performed iteratively and/or in a different order.

Figure 3:
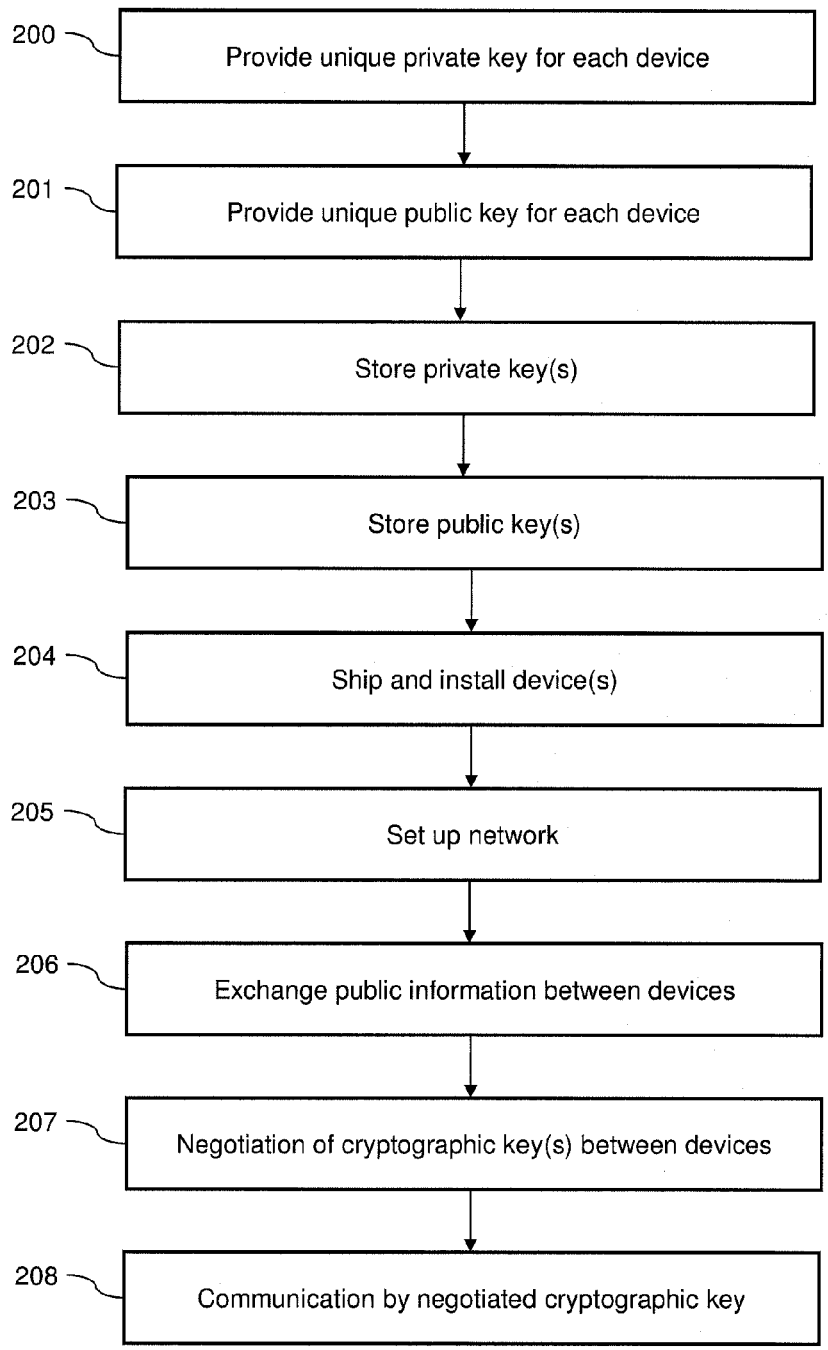
FIG. 3 is a detailed flowchart of a method for protecting a negotiation of at least one cryptographic key between devices according to an embodiment.

FIG. 3 shows a detailed flowchart of a method for protecting a negotiation of at least one cryptographic key between devices according to an embodiment.

In 200, a private key is provided for precisely one individual device. In an analogous method step 201, a public key is provided for precisely one device. Typically, operations 200 and 201 are performed repeatedly until a private key and a public key are present for each individual device. Providing the keys in 200 and 201 can be effected for example by generating random numbers, passwords, identification numbers, device identities and/or by other suitable key provisioning methods.

The private key is stored in 202, and the public key in 203. Analogously to the providing of the private key and the public key in 200 and 201, operations 202 and 203 can be performed repeatedly. As a result the respective private key will be stored on each individual device in 202, and the respective public key on each device in 203.

In a following (optional) operation 204, the device in which the private key and the public key are stored is shipped and installed. Typically, a plurality of devices will be installed in this case.

In a further preparatory operation 205, the network by which the devices can communicate with one another is set up. Setting up a network includes both the provisioning of physical hardware and the provisioning of control commands or network protocols. For example, a peer-to-peer or a client-server network can be set up in 205.

In a following (optional) operation 206 it is possible to exchange public information, for example a public key, between the devices. The exchanging of the public key in 206 can serve for example for identifying communication partners, which is to say other devices. The public key can include for example a serial number and/or a network address of a device.

A negotiation of the at least one cryptographic key can now take place between the devices in 207. The negotiation is conducted here as a function of an encryption of the messages by the private key and/or the public key provided in 200 and 201 respectively. Once the cryptographic key has been negotiated between the devices, the devices communicate with one another in 208. It is advantageous in this case to encrypt or protect the communication by the negotiated cryptographic key.

The described method can include sub-steps and also be performed iteratively and/or in a different order.

In a further embodiment of the method for protecting a negotiation of at least one cryptographic key, use is made of the BACnet network protocol. BACnet serves in this case as the transport protocol for the cryptographic messages and for a deployment of asymmetric cryptography. The protocol requiring protection can in this case be employed equally as a protocol for secure negotiation of keys. For this purpose a device certificate can be stored together with the public key and the associated private key and a root certificate during the manufacture of the devices. In this case a key server is provided which communicates with the devices. Firstly, a reciprocal authentication of device and key server is performed per device. Following successful authentication, a key which is used as a device master key is then negotiated between devices and key server. This negotiation can be conducted in plaintext, since the key itself is not transmitted.

Standard protocols that fulfill the corresponding requirement, such as TLS or Diffie-Hellman for example, can be used as authentication and key negotiation protocols. Elliptic curves can be used as the encryption mechanism. Other cryptographic protocols can also be used, however. BACnet, for example, can be employed as the transport protocol for the authentication and the key negotiation messages. Proprietary BACnet object properties described by the standard BACnet services can be defined for this purpose.

Particularly advantageous in this case is the combination of asymmetric cryptography, whose parameters can be stored in the devices already during manufacture, and the use in addition of BACnet as a transport protocol for the authentication and key negotiation.

A secure key negotiation thus takes place over unsecured BACnet networks. For key negotiation using asymmetric methods there is no need to secure the transmitted individual messages. Nonetheless the negotiated key is known only to the devices involved. This removes the need for special cabling for the transmission or additional network interfaces for the secure connection to the key server.

Furthermore, no additional protocol is necessary for transporting messages for authentication and key negotiation, because BACnet is used. Unequivocal authentication of the devices is also possible. The use of certificates permits the unique authentication of the devices during the key negotiation, if this is required. Moreover, no additional configuration effort is required for distributing the device master keys during the installation. As a result of storing the required data during manufacture, no additional effort is necessary for distributing the device master keys at installation time. If necessary, a secure renegotiation of the device master key can take place without physical access to the devices. Devices used in building automation may be installed at very inaccessible sites. If for whatever reasons a new device master key is required, it can easily be renegotiated in a secure manner over the network on the basis of the available asymmetric data.

Furthermore, the device master key is known only in the device and in the key server. This provides additional security. Moreover, no additional interfaces are necessary for reading out or entering the key. The devices do not necessarily have to include a user interface which permits the input or readout of a key. If the required data for negotiating the key is furnished during manufacture, a user interface is not necessary for this purpose.

Figure 4:
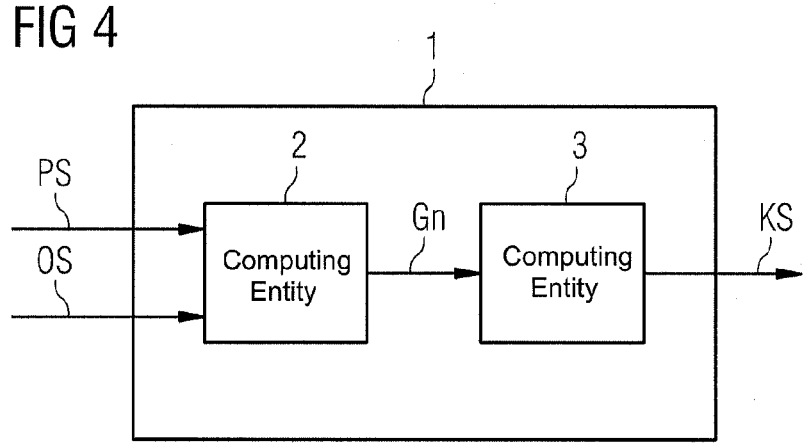
FIG. 4 is a block diagram of an apparatus for protecting a negotiation of at least one cryptographic key between devices according to an embodiment.

FIG. 4 shows an apparatus 1 for protecting a negotiation of at least one cryptographic key KS between devices Gn according to an embodiment. The apparatus 1 includes: a first computing entity 2 for storing a private key PS and a public key OS in one data storage facility in each case in each individual device Gn, the private key PS and the public key OS being provided for the respective device Gn; and a second computing entity 3 for negotiating the at least one cryptographic key KS between the devices Gn as a function of the stored private key PS and the stored public key OS.

Figure 5:
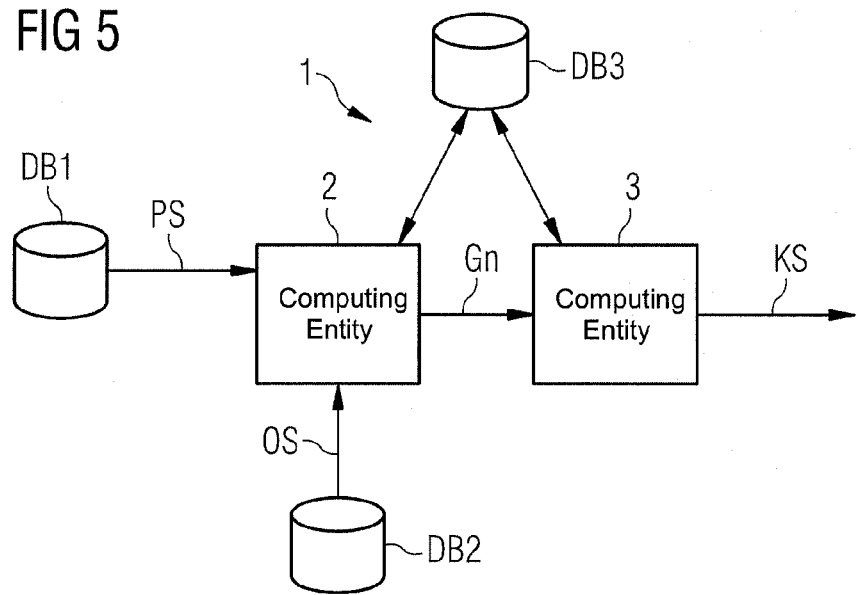
FIG. 5 is a detailed block diagram of an apparatus for protecting a negotiation of at least one cryptographic key between devices according to an embodiment.

FIG. 5 shows an apparatus 1 according to a further embodiment that differs from the apparatus 1 shown in FIG. 4. In the present exemplary embodiment the first computing entity 2 communicates with a remote data storage facility DB1. In this case the private key PS can for example be read out from the remote data storage facility DB1. Furthermore, the first computing entity 2 also communicates with another data storage facility DB2 and in the process reads out the public key OS. The data storage facility DB1 and the data storage facility DB2 can be operated by a key provisioning authority. The data storage facility DB1 and DB2 can in each case be a database of a key server. The first computing entity 2 can be integrated for example in an RFID chip. The first computing entity 2 accordingly stores the private key PS and the public key OS on an RFID chip. The RFID chip can be mounted on a device.

The second computing entity 3 can be present for example as a microprocessor which is integrated in one of the devices Gn. In this case it is possible that the device Gn is suitable for reading out the private key PS and the public key OS from the RFID chip. The device Gn can also have a separate data storage facility DB3. The data storage facility DB3 can for example be incorporated in the RFID chip. Accordingly, the first computing entity 2 reads out the private key PS and the public key OS from a first data storage facility DB1 and a second data storage facility DB2 and stores these in the data storage facility DB3.

In a further embodiment of the apparatus 1 for protecting a negotiation of at least one cryptographic key KS, the first computing entity 2, the second computing entity 3 and the data storage facility DB3 are incorporated in the device Gn. In the exemplary embodiment the device Gn is accordingly suitable for negotiating the cryptographic key KS with further devices Gn as a function of the provided private key PS and the provided public key OS.

The storage facilities may include permanent or removable storage, such as magnetic and optical discs, RAM, ROM, etc. on which the process and data structures of the present invention can be stored and distributed. The processes can also be distributed via, for example, downloading over a network such as the Internet. The computing entities may output to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for protecting negotiation of at least one cryptographic key to secure communication between devices, comprising:
   storing a private key and a public key on each of the devices, during at least one of manufacture of each device and prior to being put into operation, the private key and the public key being provided for each device;
   storing key pairs, each key pair including the private key and the public key for one of the devices, on a device management station;
   creating at least one security certificate using a function of at least one of the public keys to allow an authentication check for at least one of the devices; and
   negotiating the at least one cryptographic key between at least two of the devices, after the devices have been put into operation, as a function of the stored private key and the stored public key by the device management station.

2. The method as claimed in claim 1, wherein said negotiating the at least one cryptographic key is conducted in accordance with a network protocol.

3. The method as claimed in claim 2, wherein the network protocol implements at least one cryptographic method.

4. The method as claimed in claim 3, wherein said negotiating is conducted at least partly by a building automation and control network protocol.

5. The method as claimed in claim 4, wherein said negotiating includes at least one message exchange directly or indirectly between the devices.

6. The method as claimed in claim 5, wherein the at least one message exchange is realized by at least one wireless or wired network.

7. The method as claimed in claim 6, wherein said creating the at least one security certificate uses a function of at least one of the public keys.

8. The method as claimed in claim 7, wherein at least one of the public keys, private keys and cryptographic keys has at least one of a timestamp, an access authorization indicator, an alphanumeric character string, a numeric value and key data.

9. The method as claimed in claim 8, wherein said providing of the private key and the public key are performed by a key server.

10. A system for securing communication between devices by protecting negotiation of at least one cryptographic key to secure communication between the devices, comprising:
    a device management station storing at least one security certificate using a function of at least one of the public keys to allow an authentication check and key pairs, each including a private key and a public key for one of the devices, and
    each device having
      a data storage facility;
      a first computing entity of the device storing the private key and the public key of the device in the data storage facility, during at least one of manufacture of the device and prior to the device being put into operation, the private key and the public key being provided for the device; and
      a second computing entity negotiating the at least one cryptographic key with another of the devices after the devices have been put into operation, as a function of the private key and the public key of the device as stored in one of the key pairs by the device management station.

11. The system as claimed in claim 10, further comprising a key server providing the private key and the public key to the first computing entity of each of the devices.

12. A nontransitory computer readable medium embodying instructions that when executed by at least one processor perform a method of securing communication between devices by protecting negotiation of at least one cryptographic key between the devices, said method comprising:
    storing a private key and a public key on each of the devices, during at least one of manufacture of each device and prior to being put into operation, the private key and the public key being provided for each device;
    storing key pairs, each key pair including the private key and the public key for one of the devices, on a device management station;
    creating at least one security certificate using a function of at least one of the public keys to allow an authentication check for at least one of the devices; and
    negotiating the at least one cryptographic key between at least two of the devices, after the devices have been put into operation, as a function of the stored private key and the stored public key by the device management station.

13. The nontransitory computer readable medium as claimed in claim 12, wherein said negotiating is conducted at least partly by a building automation and control network protocol.

14. The nontransitory computer readable medium as claimed in claim 13, wherein at least one of the public keys, private keys and cryptographic keys has at least one of a timestamp, an access authorization indicator, an alphanumeric character string, a numeric value and key data.

* * * * *